US010763033B2

(12) United States Patent
Tachibana et al.

(10) Patent No.: US 10,763,033 B2
(45) Date of Patent: Sep. 1, 2020

(54) MULTILAYER COIL COMPONENT AND INSPECTION SYSTEM FOR MULTILAYER COIL COMPONENT

(71) Applicant: Murata Manufacturing Co., Ltd., Kyoto-fu (JP)

(72) Inventors: Kaoru Tachibana, Nagaokakyo (JP); Kouta Nakao, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 61 days.

(21) Appl. No.: 16/160,630

(22) Filed: Oct. 15, 2018

(65) Prior Publication Data

US 2019/0115143 A1    Apr. 18, 2019

(30) Foreign Application Priority Data

Oct. 16, 2017   (JP) ................................. 2017-200133

(51) Int. Cl.
*H01F 27/28* (2006.01)
*H01F 27/245* (2006.01)
(Continued)

(52) U.S. Cl.
CPC ......... *H01F 27/2804* (2013.01); *G01N 22/00* (2013.01); *H01F 17/0013* (2013.01);
(Continued)

(58) Field of Classification Search
None
See application file for complete search history.

(56) References Cited

U.S. PATENT DOCUMENTS

| 6,157,285 A * | 12/2000 | Tokuda ............... H01F 17/0013 336/200 |
| 2008/0012679 A1* | 1/2008 | Okabe ..................... H01F 10/20 336/200 |

(Continued)

FOREIGN PATENT DOCUMENTS

| JP | 2005-191191 A | 7/2005 |
| JP | 2005191191 A * | 7/2005 |

(Continued)

OTHER PUBLICATIONS

An Office Action; "Notification of Reasons for Refusal," mailed by the Korean Patent Office dated Jun. 20, 2019, which corresponds to Korean Patent Application No. 10-2018-0121733 and is related to U.S. Appl. No. 16/160,630; with English language translation.

(Continued)

*Primary Examiner* — Jas A Sanghera
(74) *Attorney, Agent, or Firm* — Studebaker & Brackett PC

(57) ABSTRACT

A multilayer coil component includes magnetic layers and inner electrode layers that are alternately laminated on one another. The inner electrode layers are electrically connected to each other to constitute a helical coil conductor. The coil conductor is buried in an element body composed of the magnetic layers. Outer electrodes having folded portions are disposed on both end portions of the element body. The inner electrode layers of the coil conductor have protrusions protruding from both outer edges extending in a length direction of the element body.

20 Claims, 13 Drawing Sheets

(51) Int. Cl.
  *G01N 22/00* (2006.01)
  *H01F 27/29* (2006.01)
  *H01F 17/00* (2006.01)
(52) U.S. Cl.
  CPC .......... *H01F 27/245* (2013.01); *H01F 27/29* (2013.01); *H01F 27/292* (2013.01); *H01F 2027/2809* (2013.01)

(56) References Cited

U.S. PATENT DOCUMENTS

| | | | |
|---|---|---|---|
| 2010/0109829 A1* | 5/2010 | Sugiyama | H01F 17/0013 336/200 |
| 2010/0194513 A1* | 8/2010 | Ozawa | H01F 17/0013 336/200 |
| 2012/0032767 A1* | 2/2012 | Iwasaki | H01F 17/0013 336/200 |
| 2015/0294780 A1 | 10/2015 | Maeda | |

FOREIGN PATENT DOCUMENTS

| | | |
|---|---|---|
| JP | 2009-099699 A | 5/2009 |
| JP | 2015-051908 A | 3/2015 |
| WO | 2010092861 A1 | 8/2010 |
| WO | 2014061670 A1 | 4/2014 |

OTHER PUBLICATIONS

An Office Action; "Notification of Reasons for Refusal," Mailed by the Japanese Patent Office dated Nov. 27, 2019, which corresponds to Japanese Patent Application No. 2017-200133 and is related to U.S. Appl No. 16/160,630; with English language translation.

* cited by examiner

MULTILAYER COIL COMPONENT AND INSPECTION SYSTEM FOR MULTILAYER COIL COMPONENT

CROSS-REFERENCE TO RELATED APPLICATION

This application claims benefit of priority to Japanese Patent Application No. 2017-200133, filed Oct. 16, 2017, the entire content of which is incorporated herein by reference.

BACKGROUND

Technical Field

The present disclosure relates to a multilayer coil component and an inspection system for a multilayer coil component, and, more particularly, to a multilayer coil component suitable for noise suppression in communication devices used in a high frequency band and an inspection system for a multilayer coil component for finding defective multilayer coil components.

Background Art

In recent years, a wireless LAN or other wireless computer networks that use a wireless network to send and receive data has been quickly spread. In the wireless LAN of this type, communication is generally performed in a high frequency band of about 2.4 GHz band or about 5 GHz band, requiring noise suppression in the high frequency band.

A noise suppression component is required to have high impedance in the above high frequency bands and have a low DC resistance. A multilayer coil component including ferrite beads in an element body has been traditionally used as a noise suppression component. The multilayer coil component of this type generally has a horizontally-wound structure or a vertically-wound structure. In the horizontally-wound structure, the helical coil conductor in the element body has layers in the length direction of the element body. In the vertically-wound structure, the helical coil conductor has layers in a direction perpendicular to the length direction of the element body i.e., in the thickness direction of the element body.

The multilayer coil component having the horizontally-wound structure has smaller stray capacitance between the coil conductor and the outer electrode, allowing impedance to be high in a high frequency band. However, the horizontally-wound structure is unsuitable for a recent large current, low DC resistance coil component.

In contrast, the multilayer coil component having the vertically-wound structure generally has larger stray capacitance than that having the horizontally-wound structure. In this configuration, although the impedance is relatively low, the DC resistance is low. In the multilayer coil component having the vertically-wound structure, resonance occurs in impedance in a high frequency band of not less than about 2 GHz band. Thus, a multilayer coil component that efficiently removes noise is achieved by shifting the peak frequency toward the high frequency band, which requires noise suppression, such that impedance increased by resonance is used.

As illustrated in FIG. 12, Japanese Unexamined Patent Application Publication No. 2015-51908 (claim 8 and FIG. 3, for example) discloses a multilayer electronic component including an element body 101 composed of laminated magnetic layers, a coil conductor 102 in the element body 101, and outer electrodes 103a and 103b on both end portions of the element body 101. The element body 101 has a length l, a width w, and a thickness t. The outer electrodes 103a and 103b respectively have folded portions 103a' and 103b' electrically connected to the coil conductor 102. In the multilayer coil component, the element body 101 includes ferrite and glass. The glass includes at least one oxide of an element selected from the group consisting of Si and B, at least one oxide of an element selected from the group consisting of Li, K, and Ca, at least one oxide of an element selected from the group consisting of V and Mn, and at least one oxide of an element selected from the group consisting of Ti and Al.

The multilayer electronic component in Japanese Unexamined Patent Application Publication No. 2015-51908 has a vertically-wound structure. The element body 101 is formed of the magnetic layers laminated in the thickness direction. The coil conductor 102 is buried in the element body 101 with the layers arranged in the thickness direction.

In Japanese Unexamined Patent Application Publication No. 2015-51908, the element body 101 is formed of a composite material including ferrite and glass, which has a lower dielectric constant than the ferrite. This reduces stray capacitance between the outer electrodes 103a and 103b and the coil conductor 102 to some extent, reducing degradation of impedance characteristics possibly caused by the stray capacitance.

However, the multilayer electronic component in Japanese Unexamined Patent Application Publication No. 2015-51908 is typically produced by using a multi-piece production technique in which multiple pieces of multilayer articles are cut out from a large multilayer mother block. The following problems are inherent in the technique.

FIGS. 13A and 13B are see-through views (LW plane) of a multilayer electronic component in FIG. 12 seen through the top.

Specifically described, as illustrated in FIG. 13A, when the multilayer mother block is properly cut with a cutting tool such as a dicer in the length direction and the width direction, a multilayer article obtained from the large multilayer mother block has the coil conductor 102, which has been subjected to firing, at substantially the center of the element body 101.

In this case, a distance l1 between the coil conductor 102 and the element body 101 in the length direction and a distance w1 between the coil conductor 102 and the element body 101 in the width direction are sufficiently large. Furthermore, the thickness t of the multilayer electronic component is adjusted by changing the thickness of magnetic sheets used in the production. Furthermore, since the element body 101 is composed of a composite material including a ferrite material and a glass material, stray capacitance is unlikely to increase as described above.

However, in the step of cutting the multilayer mother block, the multilayer mother block may deform, or the cutting position may be displaced. In such a case, as illustrated in a portion "a" in FIG. 13B, the coil conductor 102 may be positioned closer to the folded portion 103b' of the outer electrode 103b, for example, making the distance w1 between the element body 101 and the coil conductor 102 in the width direction smaller. This may increase stray capacitance between the coil conductor 102 and the folded portion 103b'. Thus, impedance characteristics particularly in a high frequency band may be degraded, resulting in improper noise removal.

Furthermore, there is no inspection system that automatically finds defective multilayer electronic components, which have degraded impedance characteristics in a high frequency band, at a low cost and at a high speed. Thus, defective products that do not sufficiently remove noise may be distributed to the market.

SUMMARY

Accordingly, the present disclosure was made in the view of the above-described circumstance, and provides a multilayer coil component that efficiently removes noise in a high frequency band and an inspection system that quickly finds a defective multilayer coil component at a low cost.

A multilayer coil component having a vertically-wound structure according to an embodiment of the present disclosure includes magnetic layers constituting an element body, and inner electrode layers laminated with the magnetic layers alternately on one another. The inner electrode layers are electrically connected to each other to form a helical coil conductor buried in the element body. The multilayer coil component further includes outer electrodes provided on both end portions of the element body, the each outer electrodes having a folded portion. The inner electrode layers of the coil conductor have protrusions protruding from both outer edges extending in a length direction of the element body.

In a multilayer coil component according to a preferred embodiment of the disclosure, the protrusions each have a protrusion length ranging from about 5 µm to about 15 µm in a width direction of the element body. This configuration minimizes a decrease in the yield rate and also enables efficient rejection of a multilayer coil component having large stray capacitance that degrades the impedance characteristics.

In a multilayer coil component according to a preferred embodiment of the disclosure, a gap between a tip of the protrusion and an edge of the element body in the width direction thereof is not less than about 5 µm, preferably not less than about 10 µm. This configuration effectively reduces stray capacitance between the protrusion and the outer electrode.

In a multilayer coil component according to a preferred embodiment of the disclosure, a resonant frequency is not less than about 2 GHz. In this configuration, the multilayer coil component is self-resonant in a high-frequency band of not less than about 2 GHz. The multilayer coil component having a high noise removal effect is obtained by using impedance increased by the resonant.

In a multilayer coil component according to a preferred embodiment of the disclosure, the element body is composed of one of a composite material including at least a ferrite material and a glass material and a composite material including at least a ferrite material and a resin material. In this configuration, the element body is composed of a composite material including a ferrite material, which has a high complex magnetic permeability, and one of a glass material and a resin material, which has a low dielectric constant. Thus, a multilayer coil component that efficiently removes noise particularly in a higher frequency band of not less than about 5 GHz band is obtained. In this case, the element body preferably contains a ceramic filler, for example, forsterite or quartz. Thus, the composite material includes the ferrite material, and one of the glass material and the resin material, and the ceramic filler.

In a multilayer coil component according to a preferred embodiment of the disclosure, each of the inner electrode layers has at least one of the protrusions, and the protrusions of the inner electrode layers adjacent to each other in a thickness direction of the element body with one of the magnetic layers therebetween do not overlap each other in plan view. With this configuration, the protrusions of the layers located on one another do not overlap each other, although the width of the coil conductor is increased by the protrusions. This configuration allows the magnetic layers and the inner electrode layers to be kept sufficiently in contact with each other, reducing structural defects such as delamination.

In a multilayer coil component according to a preferred embodiment of the disclosure, the inner electrode layers include first and second inner electrode layers having the protrusions and at least one third inner electrode layer not having the protrusion. The at least one third inner electrode layer is disposed between the first inner electrode layer and the second inner electrode layer. In this configuration, the inner electrode layer not having the protrusion is located between the inner electrode layers having the protrusions. This configuration allows the magnetic layers and the inner electrode layers to be close in contact with each other, reducing structural defects such as delamination.

In a multilayer coil component according to a preferred embodiment of the disclosure, the protrusions have a substantially rectangular shape. Also, in a multilayer coil component according to a preferred embodiment of the disclosure, the protrusions have a substantially trapezoidal shape.

In a multilayer coil component according to a preferred embodiment of the disclosure, the coil conductor has an inner side dented toward the protrusion. This configuration increases the area located inwardly from the coil conductor, leading to an increase in impedance.

An inspection system for a multilayer coil component according to an embodiment of the disclosure is an inspection system for a multilayer coil component having a vertically-wound structure. The multilayer coil component includes magnetic layers constituting an element body, and inner electrode layers laminated with the magnetic layers alternately on each other. The inner electrode layers are electrically connected to each other to form a helical coil conductor buried in the element body. The system includes allowing the inner electrode layers to have protrusions protruding from both outer edges thereof extending in a length direction of the element body and determining whether at least one of the protrusions is exposed from the element body through an edge of the element body in a width direction thereof to inspect quality of the multilayer coil component.

The gap between the edge of the element body in the width direction and the conductive pattern may be small due to production variations and stray capacitance may be large due to the conductive pattern positioned close to the outer electrode. In such a case, since the multilayer coil component having the vertically-wound structure includes the coil conductor composed of the inner electrode layers having protrusions protruding from both outer edges extending in the length direction of the element body, the protrusion is exposed from the element body through the edge in the width direction. This allows removal of the product having the exposed protrusion. Thus, multilayer coil components that efficiently remove noise in a high frequency band and that have high impedance characteristics are efficiently obtained. In other words, the quality of the multilayer coil component is able to be checked by using the protrusion.

Furthermore, the inspection system for a multilayer coil component includes, in the multilayer coil component having a vertically-wound structure, allowing the coil conductor to have protrusions protruding in the width direction of the element body from both outer edges extending in the length direction of the element body and determining whether the protrusion is exposed through the edge of the element body in the width direction to inspect the quality of the multilayer coil component. In the inspection system, defective products that have large stray capacitance due to the coil conductor located close to the outer electrode are readily found through appearance check.

Other features, elements, characteristics and advantages of the present disclosure will become more apparent from the following detailed description of preferred embodiments of the present disclosure with reference to the attached drawings.

DETAILED DESCRIPTION

An embodiment of the disclosure is described in detail.

Figure 1:
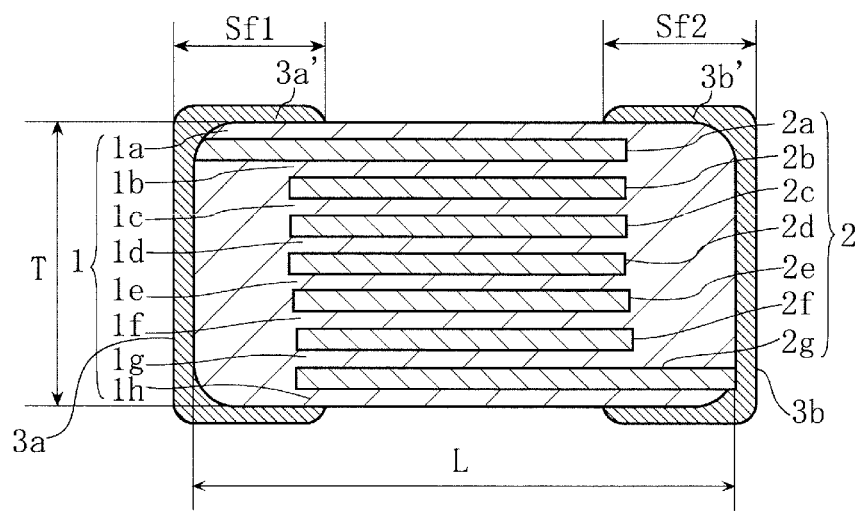
FIG. 1 is a cross-sectional view schematically illustrating an embodiment (first embodiment) of a multiplayer coil component according to the disclosure.

FIG. 1 is a vertical cross-sectional view (LT plane) schematically illustrating a multilayer coil component according to an embodiment (first embodiment) of the disclosure.

The multilayer coil component includes magnetic layers $1a$ to $1h$ and inner electrode layers $2a$ to $2g$ that are alternately laminated on one another. The inner electrode layers $2a$ to $2g$ are electrically connected to each other through a conductive via (not illustrated) to form a helical coil conductor 2. The coil conductor 2 is buried in an element body 1 composed of the magnetic layers $1a$ to $1h$. The element body 1 has a length L, a width W (FIG. 2), and a thickness T. An outer electrode $3a$ having a folded portion $3a'$ having a length of Sf1 and an outer electrode $3b$ having a folded portion $3b'$ having a length of Sf2 are disposed on two end portions of the element body 1. As shown in FIG. 1, the folded portions $3a'$ and $3b'$ are provided on side surfaces of the element body 1, so they may be called side surface folded portions $3a'$ and $3b'$. The multilayer coil component has a vertically-wound structure in which the coil conductor 2 has layers in a direction perpendicular to the length direction of the element body 1, i.e., in the thickness direction of the element body 1.

Figure 2:
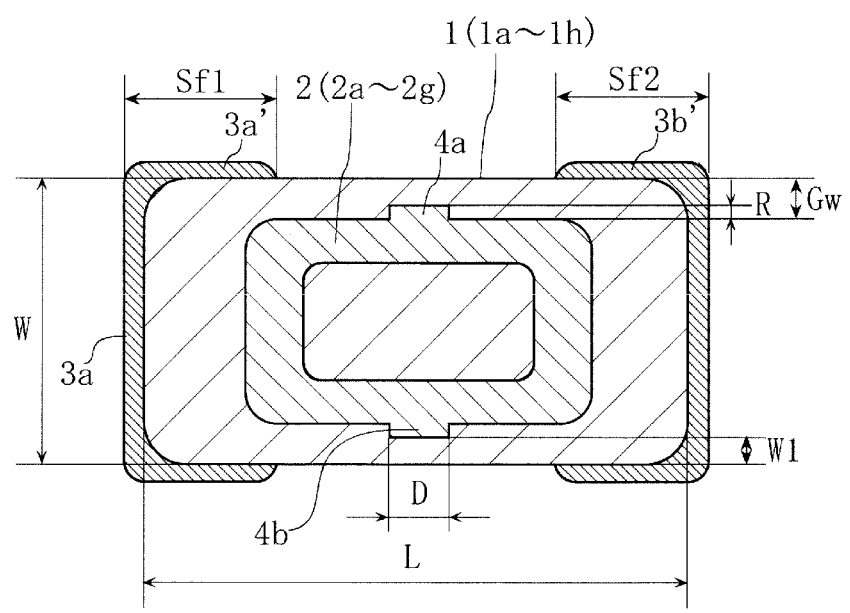
FIG. 2 is a see-through view (LW plane) of the multilayer coil component seen through the top.

FIG. 2 is a see-through view (LW plane) of the multilayer coil component seen through the top. In FIG. 2, portions of the coil conductor 2 extending to the outer electrodes $3a$ and $3b$ are not illustrated.

The inner electrode layers $2a$ to $2g$ included in the coil conductor 2 have substantially rectangular protrusions $4a$ and $4b$ protruding from the respective edges extending in the length direction of the element body 1. The protrusions $4a$ and $4b$ each have a protrusion width D and a protrusion length R.

With this configuration, a distance GW (hereinafter referred to as a "W-side gap") between an edge of the element body 1 in the width direction (hereinafter, referred to as a "W edge") and an outer periphery of the coil conductor 2 is able to be checked by using the protrusion length R of the protrusion $4a$ or $4b$. Specifically described, the coil conductor 2 may be displaced from substantially the center of the element body 1 due to production variations and the W-side gap Gw may be made smaller. In such a case, the protrusions $4a$ or $4b$ may be exposed through the W edge. This allows products having the exposed protrusion $4a$ or $4b$ to be rejected through appearance check, minimizing the possibility that the products having large stray capacitance and degraded impedance characteristics will be distributed to the market.

The protrusion length R of the protrusions $4a$ and $4b$ may be any length that enables efficient removal of products having larger stray capacitance. A preferable protrusion length R ranges from about 5 μm to about 15 μm. The protrusion length R of less than about 5 μm increases stray capacitance a lot. To avoid such increase, the protrusions $4a$ and $4b$ preferably have a protrusion length R of not less than about 5 μm. However, the protrusion length R of more than about 15 μm increases the number of products determined as defective products, leading to a decrease in the yield rate.

A gap W1 between the tip of the protrusion $4a$ or $4b$ and the W edge is not limited to a particular value. However, if the gap W1 is too small, the coil conductor 2 is located close to the folded portion $3a'$ or $3b'$ of the outer electrode $3a$ or $3b$, leading to an increase in the stray capacitance. Thus, the gap W1 is preferably not less than about at least 5 μm, preferably not less than about 10 μm. In the disclosure, since the W-side gap Gw is checked by using the protrusion length R of the protrusion, it is effective when the W-side gap Gw is smaller than a predetermined gap, particularly not greater than about 50 μm, more particularly not greater than about 35 μm.

The multilayer coil component preferably has a resonant frequency of not less than about 2 GHz. In this configuration, the multilayer coil component is self-resonant in a high-frequency band of not less than about 2 GHz. Due to the impedance increased by the resonant, the multilayer coil component having a high noise removal effect is obtained.

The element body 1 may be formed of any material. The element body 1 may be composed only of a ferrite material, but preferably composed of a composite material including a ferrite material and one of a glass material and a resin material. The element body 1 composed of a ferrite material, which has a high complex magnetic permeability, and one of a glass material and a resin material, which has a low dielectric constant, efficiently removes noise particularly in a higher frequency band of not less than about 6 GHz band.

The ferrite material may be any ferrite material, preferably a Ni—Zn—Cu ferrite material containing about 40 mol % to about 49.5 mol % of Fe in terms of $Fe_2O_3$, about 5 mol % to about 35 mol % of Zn in terms of ZnO, about 6 mol % to about 13 mol % of Cu in in terms of CuO, with the balance being Ni. Additives such as Bi, Sn, Mn, and Co may be added as appropriate. Incidental impurities may be present in a ratio that does not affect the characteristics.

When the element body 1 contains the glass material, the glass material may be any glass material, preferably borosilicate glass containing about 70 wt % to about 85 wt % of Si in terms of $SiO_2$, about 10 wt % to about 25 wt % of B in terms of $B_2O_3$, about 0.5 wt % to about 5 wt % of K in terms of $K_2O$, and not more than about 5 wt % of Al in terms of $Al_2O_3$, for example. In such a case, the ferrite material is preferably contained at about 10 vol % to about 50 vol % relative to the total of the ferrite material and the glass material.

When the element body 1 contains the resin material, the resin material may be any resin material. Examples of the resin material include an epoxy resin and a silicone resin. In such a case, the ferrite material is preferably contained at about 50 vol % to about 80 vol % relative to the total of the ferrite material and the resin material.

The element body 1 preferably contains a filler component such as quartz, forsterite ($Mg_2SiO_4$), or $Al_2O_3$. The element body 1 preferably contains forsterite to improve transverse rupture strength.

The coil conductor 2 and the outer electrodes 3a and 3b may be formed of any conducting material mainly containing Ag, Cu, Ni, or an alloy thereof. The outer electrodes 3a and 3b each preferably have a multilayer structure including a foundation electrode layer formed of Cu, for example, and a plating film on the foundation electrode layer to improve heat resistance and conductive properties.

Next, a method of producing the multilayer coil component is described in detail. In the multilayer coil component, the element body 1 is formed of a composite material including a ferrite material and a glass material.

First, a magnetic material is produced. Specifically described, ferrite materials of $Fe_2O_3$, NiO, ZnO, and CuO are provided. Then, a predetermined amount of each of the ferrite materials is weighed, and the weighed ferrite materials are put into a pot mill together with a grinding medium, such as partially stabilized zirconia (PSZ) balls, and wet-mixed/crushed and dried, followed by calcination at about 700° C. for about two hours. Thus, ferrite powder is produced.

Furthermore, glass materials of $SiO_2$, $B_2O_3$, and $K_2O$ are provided. Then, a predetermined amount of each of the glass materials is weighed, and the weighed glass materials are put into a platinum crucible and melted at about 1500° C. to about 1600° C. to form a glass melt. The glass melt is quickly cooled and then crushed. Thus, glass powder is produced.

Next, a predetermined amount of each of the ferrite powder, the glass power, and a filler component such as forsterite, which is added as necessary, is weighed. The weighed components are put into a pot mill together with an organic binder such as polyvinyl butyral, an organic solvent such as ethanol and/or toluene, and the grinding medium, and then sufficiently mixed and crushed. Thus, the magnetic material in the form of slurry is produced.

Figure 3:
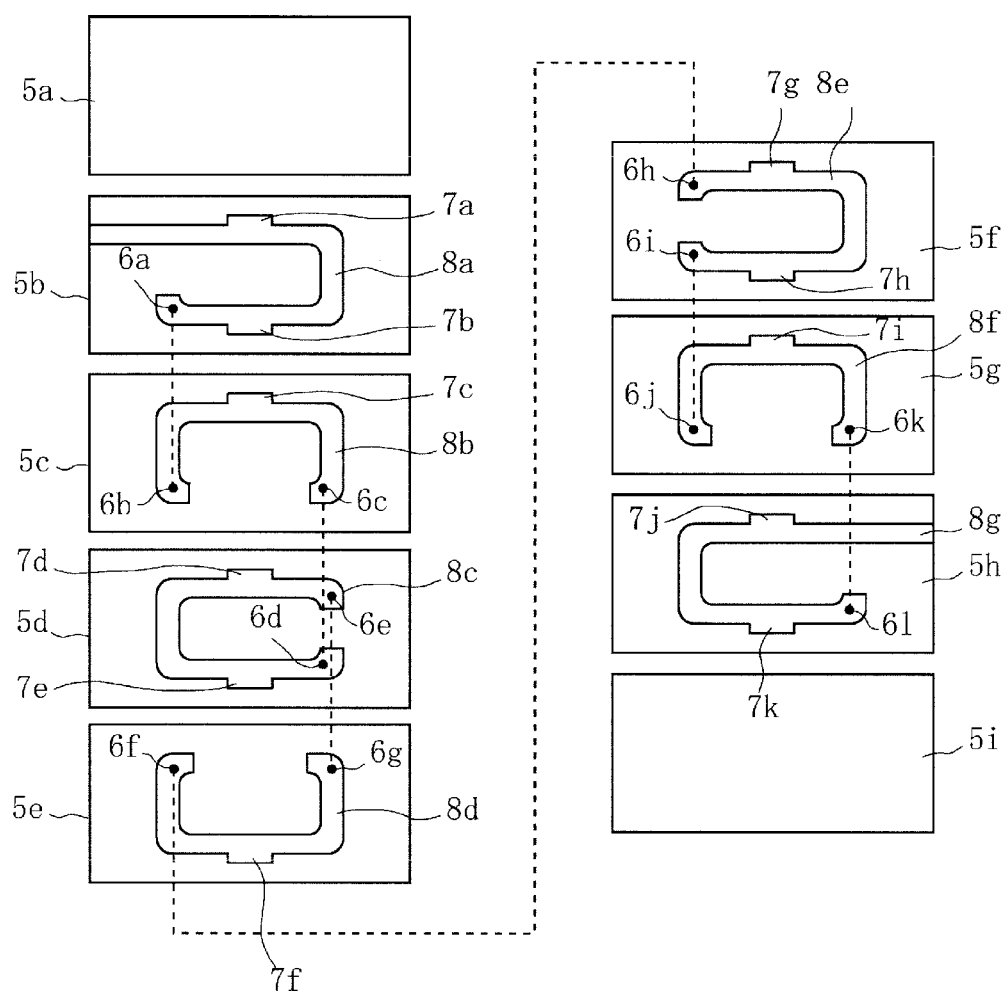
FIG. 3 is an exploded plan view indicating a method of producing an element body.

FIG. 3 is an exploded plan view of main components and indicates a method of producing a multilayer coil component.

Specifically described, the magnetic material in the form of slurry is shaped using a doctor blade technique, for example, to form magnetic sheets 5a to 5i each having a thickness ranging from about 25 μm to about 30 μm.

Then, through holes are formed in the magnetic sheets 5b to 5g among the magnetic sheets 5a to 5i at predetermined positions by laser irradiation, for example.

Then, a conductive paste composed mainly of Ag, for example, is provided. Screen printing, for example, is performed on the magnetic sheets 5b to 5h by using the conductive paste such that via conductors 6a, 6c, 6e, 6f, 6i, and 6k are formed by the conductive paste filling the through holes and conductive patterns 8a to 8g having projecting portions 7a to 7k are formed in predetermined areas having the via conductors 6a, 6c, 6e, 6f, 6i, and 6k. Please note that contact portions 6b, 6d, 6g, 6h, 6j and 6l of the conductive patterns 8b, 8c, 8d, 8e, 8f and 8g are shown in FIG. 3 beneath the via conductors 6a, 6c, 6e, 6f, 6i, and 6k.

Then, the magnetic sheets 5a to 5i are laminated on one another such that the conductive patterns 8a to 8g form a helical form through the via conductors 6a, 6c, 6e, 6f, 6i, and 6k. The laminated magnetic sheets 5a to 5i are pressed to form a multilayer mother block. Then, the multilayer mother block is cut in the width direction and the length direction into pieces with a cutting tool such as a dicer. Thus, a multilayer article is obtained.

Then, the multilayer article is put into a furnace and heated at about 900° C. for about two hours to fire the conductive patterns 8a to 8g, the via conductors 6a, 6c, 6e, 6f, 6i, and 6k, and the magnetic sheets 5a to 5i at the same time. Then, the surface of the multilayer article is polished by barrel polishing, for example, and the corners are chamfered. Thus, the element body 1 in which the helical coil conductor 2 is buried with the layers arranged in the thickness direction is produced.

Then, a conductive paste composed mainly of Cu, for example, is provided. The conductive paste is applied to two end portions of the element body 1 and baked at about 800° C. to form foundation electrodes. Then, a coating film of Ni or Sn is formed on the foundation electrodes by plating, for example. Thus, the outer electrodes 3a and 3b having the folded portions 3a' and 3b' are produced. The multilayer coil component according to the first embodiment is produced in this way.

Figure 4:
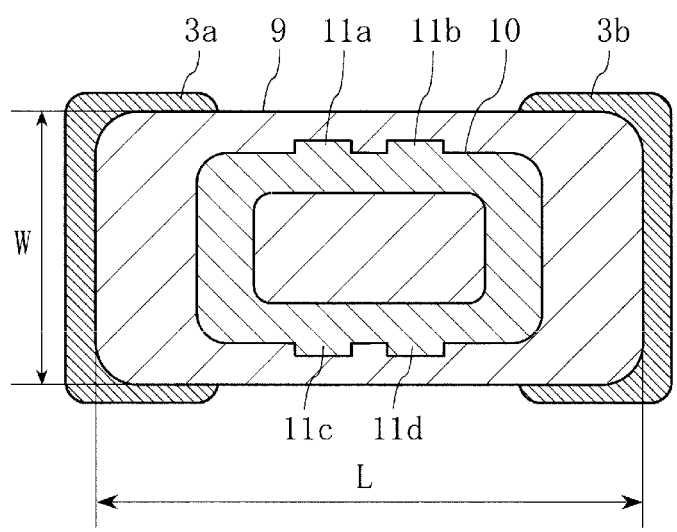
FIG. 4 is a see-through view (LW plane) of a multilayer coil component according to a second embodiment of the disclosure seen through the top.

FIG. 4 is a see-through view (LW plane) of a multilayer coil component according to a second embodiment of the disclosure.

In the second embodiment, magnetic layers, which form an element body 9, and inner electrode layers, which form a coil conductor 10, are alternately laminated on one another as in the first embodiment.

Also, in the second embodiment, the inner electrode layers each have at least one of protrusions 11a to 11d. The protrusions 11a to 11d of the inner electrode layers adjacent to each other in the thickness direction of the element body 9 with the magnetic layer therebetween do not overlap each other in plan view.

Specifically described, in the first embodiment (see FIG. 2), the protrusions 4a on the LW planes overlap each other in the thickness direction and the protrusions 4b on the LW planes overlap each other in the thickness direction. In this configuration, the thickness of the inner electrode layers 2a to 2g at the protrusions 4a and 4b is slightly larger than that at the other portions of the inner electrode layers 2a to 2g. This does not allow the magnetic layers and the inner electrode layers to be sufficiently in contact with each other when heated and pressed in the production of the multilayer mother block. This may lead to a structural defect such as delamination.

In contrast, in the second embodiment, the protrusions 11a to 11d of two of the inner electrode layers adjacent to each other with the magnetic layer therebetween do not overlap each other in plan view. With this configuration, the magnetic layers and the inner electrode layers are sufficiently in contact with each other when heated and pressed in the production of the multilayer mother block. Thus, a structural defect such as delamination is unlikely to occur.

The multilayer coil component according to the second embodiment is readily produced as described below.

Figure 5:
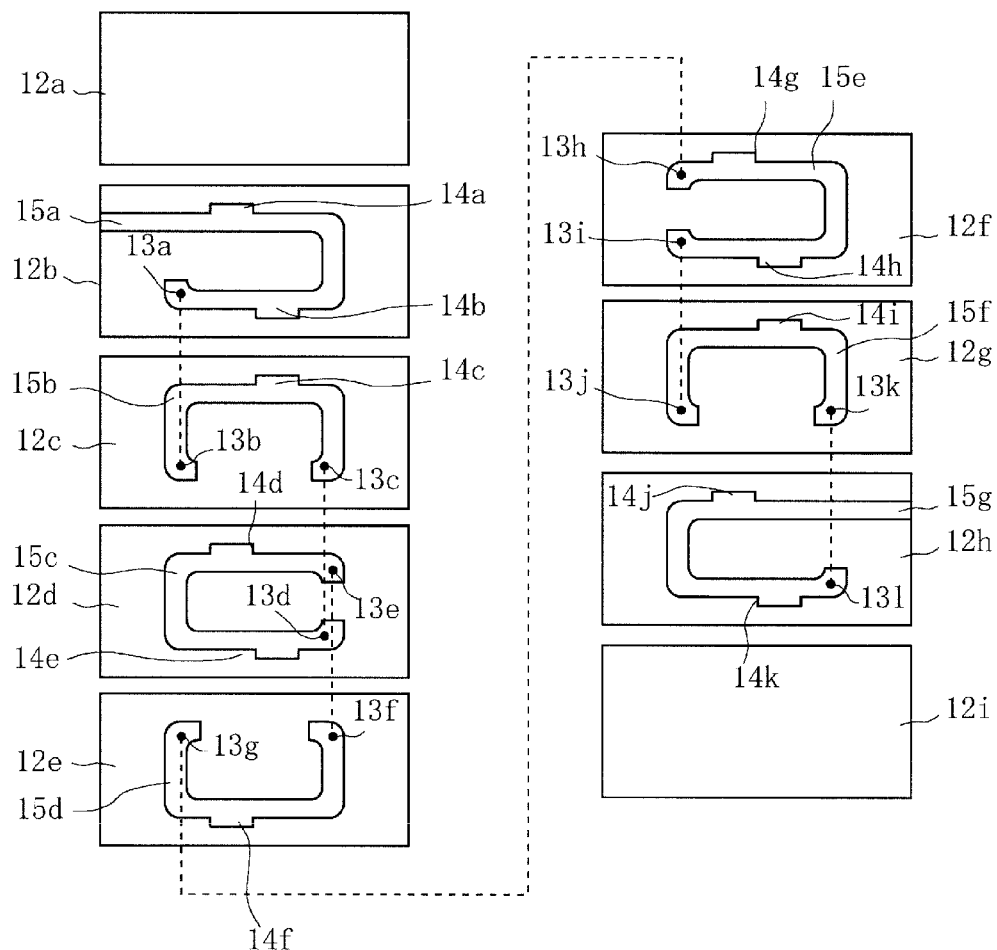
FIG. 5 is an exploded plan view indicating a method of producing an element body according to the second embodiment.

FIG. 5 is an exploded plan view of main components and indicates a method of producing the multilayer coil component according to the second embodiment.

First, magnetic sheets 12a to 12i are produced in the same manner and by the same steps as in the first embodiment.

Then, through holes are formed in the magnetic sheets 12b to 12g among the magnetic sheets 12a to 12i at predetermined positions by laser irradiation, for example.

Then, a conductive paste composed mainly of Ag, for example, is provided. Screen printing, for example, is performed on the magnetic sheets 12b to 12h by using the conductive paste such that via conductors 13a, 13c, 13e, 13g, 13i, and 13k are formed by the conductive paste filling the through holes and conductive patterns 15a to 15g having projecting portions 14a to 14k are formed in predetermined areas having the via conductors 13a, 13c, 13e, 13g, 13i, and 13k. Please note that contact portions 13b, 13d, 13f, 13h, 13j and 13l of the conductive patterns 15b, 15c, 15d, 15e, 15f and 15g are shown in FIG. 5 beneath the via conductors 13a, 13c, 13e, 13g, 13i, and 13k. In the second embodiment, the conductive patterns 15a to 15g are formed such that the projecting portions 14a to 14k of two of the conductive patterns 15a to 15g adjacent to each other with one of the magnetic sheets 12a to 12i therebetween do not overlap each other in plan view when the magnetic sheets 12a to 12i are laminated on one another such that the conductive patterns 15a to 15g form a helical form.

Then, in the same manner and by the same steps as in the first embodiment, the element body 9 having the coil conductor 10 therein is produced. Then, the outer electrodes are formed. Thus, the multilayer coil component according to the second embodiment is produced.

Then, the multilayer article is put into a furnace and heated at about 900° C. for about two hours to fire the conductive patterns 15a to 15g, the via conductors 13a, 13c, 13e, 13g, 13i, and 13k, and the magnetic sheets 12a to 12i at the same time. Then, the surface of the multilayer article is polished by barrel polishing, for example, and the corners are chamfered. Thus, the element body 9 in which the helical coil conductor 10 is buried with the layers arranged in the thickness direction is produced.

Then, the element body 9 in which the coil conductor 10 is buried with the layers arranged in the thickness direction is formed in the same manner and by the same steps as in the first embodiment. Then, the outer electrodes 3a and 3b are formed. Thus, the multilayer coil component according to the second embodiment is produced.

Figure 6:
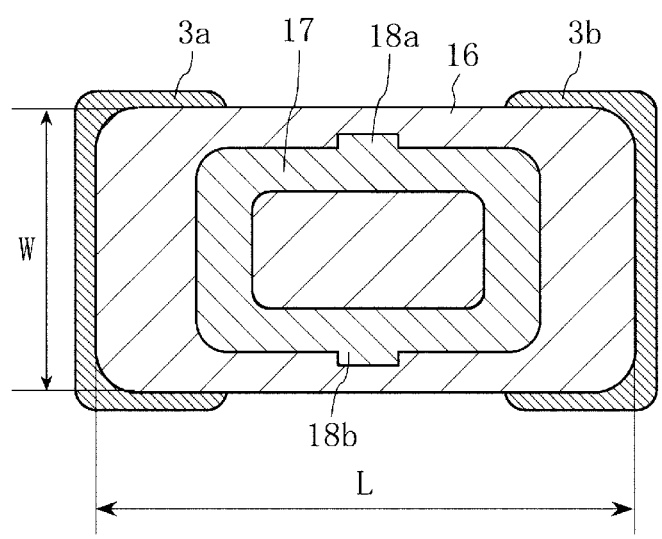
FIG. 6 is a see-through view (LW plane) of a multilayer coil component according to a third embodiment of the disclosure seen through the top.

FIG. 6 is a see-through view (LW plane) of a multilayer coil component according to a third embodiment of the disclosure.

In the third embodiment, as in the first and second embodiments, magnetic layers included in an element body 16 and inner electrode layers included in a coil conductor 17 are alternately laminated on one another.

Specifically described, the inner electrode layers include first and second inner electrode layers each having protrusions 18a and 18b and a third inner electrode layer not having a protrusion. At least one third inner electrode layer is disposed between the first inner electrode layer and the second inner electrode layer.

In the third embodiment, since at least one third inner electrode layer, which does not have the protrusion, is disposed between the first inner electrode layer and the second inner electrode layer, which have the protrusions 18a and 18b, the protrusions 18a and 18b of two of the inner electrode layers adjacent to each other with the magnetic layer therebetween do not overlap each other in plan view. Thus, as in the second embodiment, the magnetic layers and the inner electrode layers are sufficiently in contact with each other when heated and pressed in the production of the multilayer mother block. Thus, a structural defect such as delamination is unlikely to occur.

The multilayer coil component according to the third embodiment is readily produced as described below.

Figure 7:
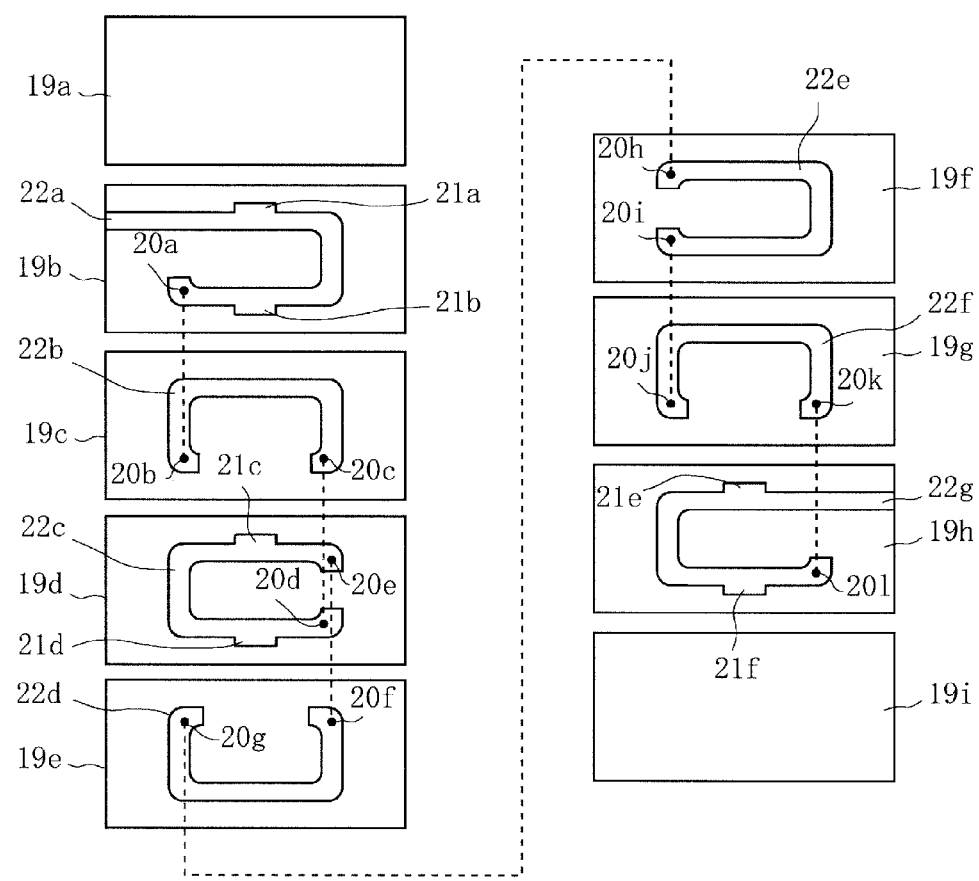
FIG. 7 is an exploded plan view indicating a method of producing an element body according to the third embodiment.

FIG. 7 is an exploded plan view of main components and indicates a method of producing the multilayer coil component according to the third embodiment.

First, magnetic sheets 19a to 19i are produced in the same manner and by the same steps as in the first embodiment.

Then, through holes are formed in the magnetic sheets 19b to 19g among the magnetic sheets 19a to 19i at predetermined positions by laser irradiation, for example.

Then, a conductive paste composed mainly of Ag, for example, is provided. Screen printing, for example, is performed on the magnetic sheets 19b, 19d, and 19h by using the conductive paste such that via conductors 20a and 20e are formed by the conductive paste filling the through holes and conductive patterns 22a, 22c, and 22g having projecting portions 21a to 21f are formed in predetermined areas having the via conductors 20a and 20e.

Then, screen printing, for example, is performed on the magnetic sheets 19c and 19e to 19g by using the above-described conductive paste such that via conductors 20c, 20g, 20i and 20k are formed by the conductive paste filling the through holes and conductive patterns 22b, and 22d to 22f not having the projecting portion are formed in predetermined areas having the via conductors 20c, 20g, 20i, and 20k. Please note that contact portions 20b, 20d, 20f, 20h, 20j and 20l of the conductive patterns 22b, 22c, 22d, 22e, 22f and 22g are shown in FIG. 7 beneath the via conductors 20a, 20c, 20e, 20g, 20i, and 20k.

Thereafter, the element body 16 in which the coil conductor 17 is buried with the layers arranged in the thickness direction is formed in the same manner and by the same steps as in the first and second embodiments. Then, outer electrodes 3a and 3b are formed. Thus, the multilayer coil component according to the third embodiment is produced.

Figure 8:
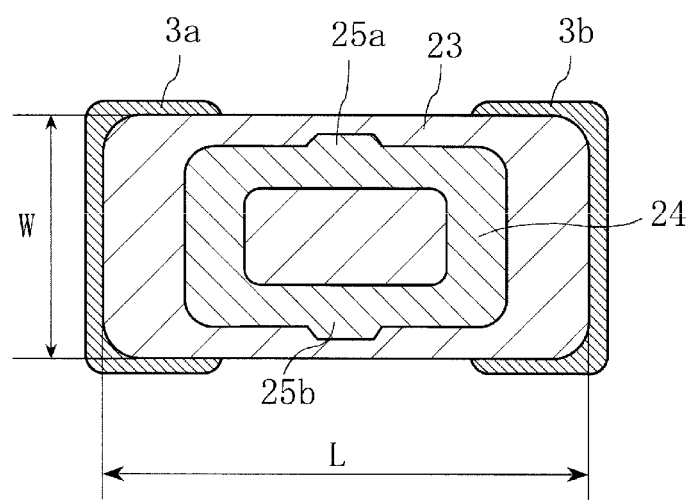
FIG. 8 is a see-through view (LW plane) of a multilayer coil component according to a fourth embodiment of the disclosure seen through the top.

FIG. 8 is a see-through view (LW plane) of a multilayer coil component according to a fourth embodiment of the disclosure.

In the fourth embodiment, as in the first embodiment, magnetic layers included in an element body 23 and inner electrode layers included in a coil conductor 24 are alternately laminated on one another. The inner electrode layers have protrusions 25a and 25b each having a substantially trapezoidal shape.

In the first embodiment, the protrusions 4a and the 4b each have a substantially rectangular shape (see FIG. 2). In the fourth embodiment, the protrusions 25a and 25b each have a substantially trapezoidal shape. This configuration reduces print blurring possibly caused in the formation of a conductive pattern and improves durability of the printed plate compared with the substantially rectangular protrusion.

Figure 9:
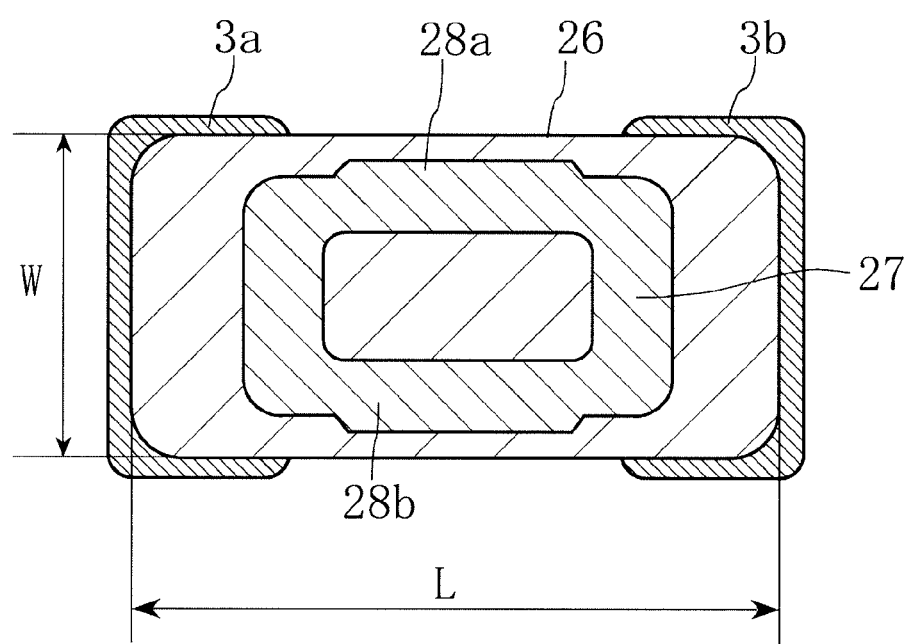
FIG. 9 is a see-through view (LW plane) of a multilayer coil component according to a fifth embodiment of the disclosure seen through the top.

FIG. 9 is a see-through view (LW plane) of a multilayer coil component according to a fifth embodiment of the disclosure.

In the fifth embodiment, as in the first embodiment, magnetic layers included in an element body 26 and inner electrode layers included in a coil conductor 27 are alternately laminated on one another. Protrusions 28a and 28b are longer in the length direction of the element body 26 than those in the first and fourth embodiments. This configuration increases a conductive area, reducing DC resistance. Thus, a multilayer coil component suitable for a larger current is obtained.

Figure 10:
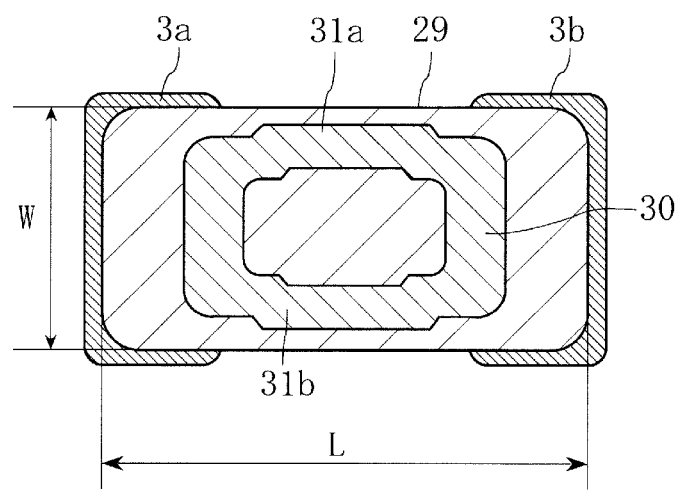
FIG. 10 is a see-through view (LW plane) of a multilayer coil component according to a sixth embodiment of the disclosure seen through the top.

FIG. 10 is a see-through view (LW plane) of a multilayer coil component according to a sixth embodiment of the disclosure.

In the sixth embodiment, as in the first embodiment, magnetic layers included in an element body 29 and inner electrode layers included in a coil conductor 30 are alternately laminated. The inner electrode layers each have inner sides dented toward the protrusions 31a and 31b. This increases the area of the element body 29, improving the impedance characteristic. Thus, a multilayer coil component having high-impedance characteristics more suitable for a higher-frequency band is obtained.

Furthermore, defective articles are able to be found through appearance check, which determines whether the protrusion is exposed through the W-side edge of the element body. The quality of the multilayer coil components is able to be quickly checked at a low cost. The protrusions allow defective articles to be efficiently rejected.

The disclosure is not limited to the above-described embodiments. In the above-described embodiments, the element body is composed of a mixture of a ferrite material and a glass material or a resin material. However, the element body may be formed of a porous ferrite. In the porous ferrite, a sintered ferrite has porosities filled with a glass material or a resin material and the glass material or the resin material has porosities.

In the first and second embodiments, the protrusion is included in each of the inner electrode layers. In the third embodiment, the inner electrode layer not having the protrusion is interposed between two of the inner electrode layers having the protrusions. However, the protrusion may be included in only at least one of the inner electrode layers such that the length of the W-side gap Gw is checked by using the protrusion to prevent an increase in the stray capacitance.

Next, examples of the disclosure are described in detail.

Example 1

A multilayer coil component having a helical coil conductor buried in an element body was formed in a software program, and stray capacitance thereof was determined by simulation using different W-side gaps of about 2, 8, 12, 22, 32, and 42 μm.

Figure 11:
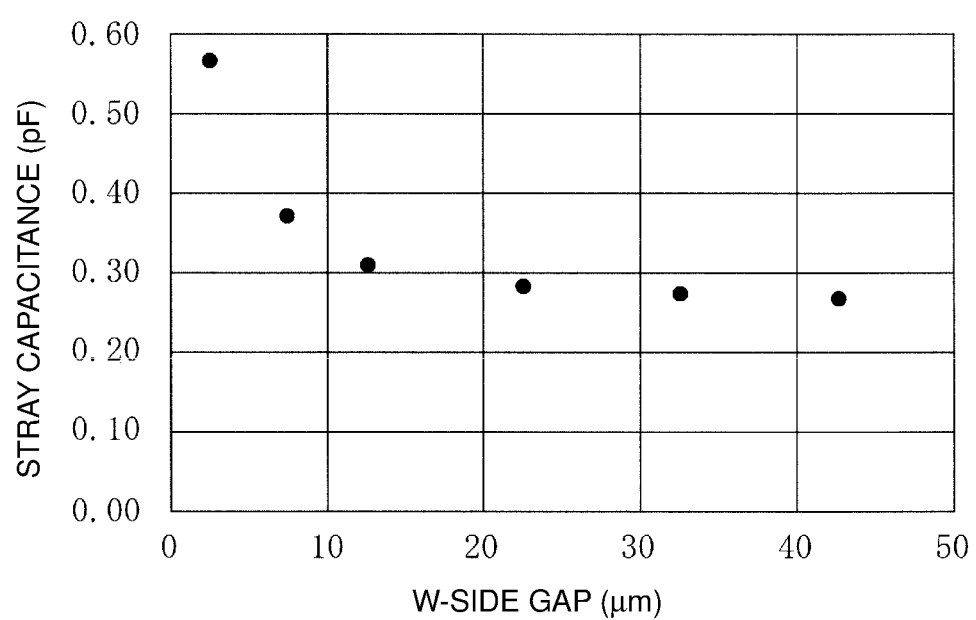
FIG. 11 is a diagram indicating relationship between a W-side gap and stray capacitance in Example 1.
Figure 12:
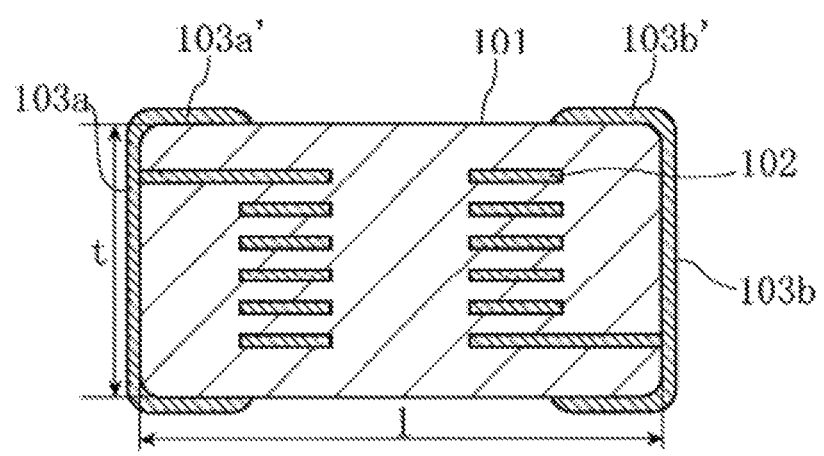
FIG. 12 is a cross-sectional view of a multilayer electronic component described in Japanese Unexamined Patent Application Publication No. 2015-51908.
Figure 13A:
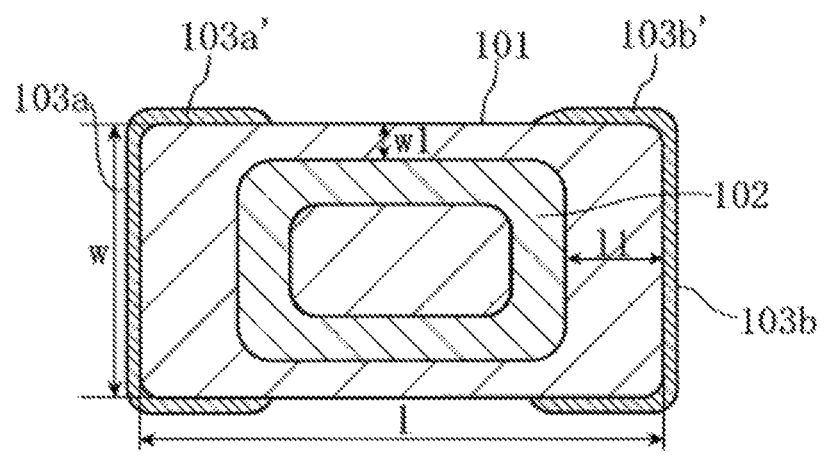
FIGS. 13A and 13B are views for explanation of the problem in the technology described in Japanese Unexamined Patent Application Publication No. 2015-51908.
Figure 13B:
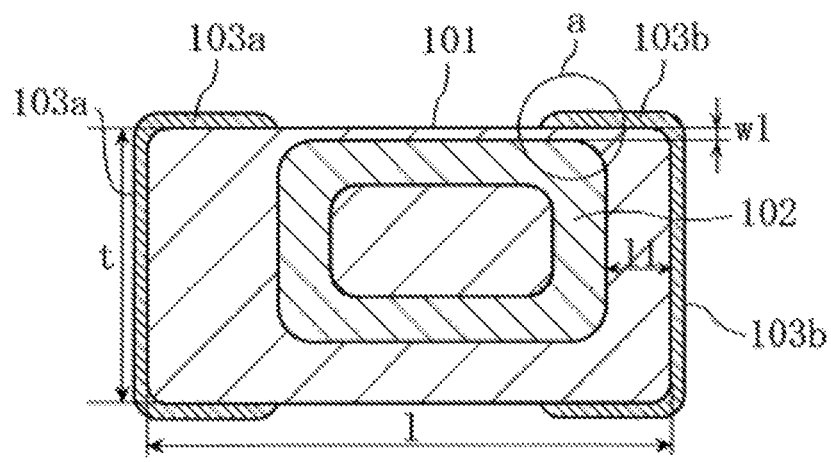

FIG. 11 indicates a relationship between the W-side gap and the stray capacitance obtained through the simulation. The horizontal axis indicates the W-side gap (μm) and the vertical axis indicates the stray capacitance (pF).

As can be seen from FIG. 11, there is a correlation between the W-side gap and the stray capacitance. The W-side gap of about 10 μm or more makes the stray capacitance relatively stable, but the W-side gap of smaller than about 10 μm, particularly smaller than about 5 μm increases the stray capacitance.

Example 2

Production of Samples of Example

First, ferrite materials of $Fe_2O_3$, NiO, ZnO, and CuO were provided. Then, 48.5 mol % of $Fe_2O_3$, 14.0 mol % of NiO, 29.5 mol % of ZnO, and 8.0 mol % of CuO were each weighed. The weighed ferrite materials were put into a pot mill together with partially stabilized zirconia (PSZ) balls and wet-mixed/crushed and dried, followed by calcination at about 700° C. for about two hours. Thus, ferrite powder was produced.

Furthermore, glass materials of $SiO_2$, $B_2O_3$, and $K_2O$ were provided. Then, 79.0 wt % of $SiO_2$, 19.0 wt % of $B_2O_3$, and 2.0 wt % of $K_2O$ were each weighed. The weighed glass materials were put into a platinum crucible and melted at about 1500° C. to about 1600° C. to form a glass melt. The glass melt was quickly cooled and then crushed. Thus, glass powder was produced.

Then, forsterite was provided. The ferrite powder, the glass powder, and the forsterite were weighed such that a ratio (by volume) of the ferrite power to the glass powder to the forsterite is 40.0:57.5:2.5. The ferrite powder, the glass powder, and the forsterite were put into a pot mill together with polyvinyl butyral as an organic binder, a mixture of ethanol and toluene as an organic solvent, and PSZ balls and then sufficiently mixed and crushed. The magnetic slurry was produced in this way. Then, the magnetic slurry was shaped using a doctor blade technique to form magnetic sheets each having a thickness of about 25 μm.

Then, through holes were formed in the magnetic sheets at predetermined positions by laser irradiation, for example.

Then, a silver paste was provided. Screen printing was performed on the magnetic sheets by using the silver paste such that via conductors were formed by the silver paste filling the through holes and conductive patterns having projecting portions were formed in a predetermined area having the via conductors.

Then, the magnetic sheets were laminated such that the conductive patterns form a helical form through the via conductors. The laminated magnetic sheets were pressed to form a multilayer mother block. Then, the multilayer mother block was cut in the length direction and the width direction into pieces with a dicer. Thus, a multilayer article was produced.

Then, the multilayer article was put into a furnace and heated at about 900° C. for about two hours to fire the conductive patterns, the via conductors, and the magnetic sheets at the same time. Then, the surface of the multilayer article was polished by barrel polishing, for example, and the corners were chamfered. Thus, the element body having the coil conductor therein was produced. In the element body, the W-side gap Gw was about 35 μm, the protrusion width D was about 40 μm, and the protrusion length R was about 10 μm.

Then, a copper paste was provided. The copper paste was applied to both end portions of the element body and baked at about 800° C. to form foundation electrodes. Then, a coating film of Ni or Sn was formed on the foundation electrodes by plating, for example. Thus, the outer electrodes having the folded portions were produced. The sample of the example was obtained in this manner. In the outer shape of the sample of the example, the length L was about 0.60 mm, the width W was about 0.30 mm, the thickness T was about 0.30 mm, and the number of turns in the coil conductor was about 5.5.

Samples of Comparative Examples

Samples of comparative examples were produced in the same manner and by the same steps as the samples of the examples except that a substantially rectangular protrusion was not formed in the conductive pattern of the samples of the comparative examples.

Evaluation on Samples

The W-side edge of each of the samples of the examples was checked. If the protrusion or the coil conductor was exposed through the W-side edge, the sample was determined as a defective and rejected. In the same way, the samples of the comparative examples were checked, and the sample that has the coil conductor exposed through the W-side edge was determined as a defective and rejected. The samples of the examples have a defective rate of about 0.3% and the samples of the comparative examples have a defective rate of about 0.05%.

Next, the self-resonant frequency was determined by using an impedance analyzer (E4991A available from Agilent Technologies, Inc.) for 100 pieces of the samples of the examples not including the defective samples. The self-resonant frequency of all the samples was not less than about 6 GHz.

Next, self-resonant frequency was determined for the rejected defective samples of the examples. The results revealed that some of the rejected defective samples have a self-resonant frequency of less than about 6 GHz.

Specifically described, since the W-side gap Gw was checked by using the protrusion of the coil conductor in the samples of the examples, the samples that have a self-resonant frequency shifted to the lower frequency due to a smaller W-side gap Gw are readily rejected. Thus, only the samples having a self-resonant frequency of not less than about 6 GHz were obtained.

In contrast, in the samples of the comparative examples, since the coil conductor does not have a protrusion, the W-side gap Gw is not checked. Thus, a defective sample that has a small W-side gap Gw and has a self-resonant frequency shifted to a low-frequency side may be included in the non-defective samples.

According to the present disclosure, a multilayer coil component that efficiently removes noise in a high-frequency band is efficiently obtained, and a defective multilayer coil component is quickly found at a low cost.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component having a vertically-wound helical coil conductor structure, comprising:
   magnetic layers constituting an element body;
   inner electrode layers laminated with the magnetic layers alternately on each other, the inner electrode layers electrically connected to each other to define the helical coil conductor embedded in the element body, and the inner electrode layers of the helical coil conductor have protrusions located at opposite outer edges of the inner electrode layers in a length direction of the element body; and
   outer electrodes provided on opposite end portions of the element body, said outer electrodes each having a folded portion,
   wherein the protrusions are arranged between portions of the inner electrode layers where the inner electrode layers are electrically connected to each other.

2. The multilayer coil component according to claim 1, wherein the protrusions each have a protrusion length ranging from about 5 μm to about 15 μm extending in a width direction of the element body.

3. The multilayer coil component according to claim 1, wherein a gap between a tip of the protrusion and an edge of the element body in the width direction thereof is not less than about 5 μm.

4. The multilayer coil component according to claim 3, wherein the gap is not less than about 10 μm.

5. The multilayer coil component according to claim 1, wherein a resonant frequency of the multilayer coil component is not less than about 2 GHz.

6. The multilayer coil component according to claim 1, wherein the element body is made of one of:
   a composite material including at least a ferrite material and a glass material, and
   a composite material including at least a ferrite material and a resin material.

7. The multilayer coil component according to claim 6, wherein the element body contains a ceramic filler.

8. The multilayer coil component according to claim 1, wherein
   each of the inner electrode layers has at least one of the protrusions, and
   the protrusions of the inner electrode layers adjacent to each other in a thickness direction of the element body with at least one of the magnetic layers therebetween do not overlap each other in plan view.

9. The multilayer coil component according to claim 1, wherein
   the inner electrode layers include first and second inner electrode layers having the protrusions and at least one third inner electrode layer which does not have the protrusion, and
   the at least one third inner electrode layer is arranged between the first inner electrode layer and the second inner electrode layer.

10. The multilayer coil component according to claim 1, wherein the protrusions have a substantially rectangular shape.

11. The multilayer coil component according to claim 1, wherein the protrusions have a substantially trapezoidal shape.

12. The multilayer coil component according to claim 1, wherein the coil conductor has an inner side dented toward the protrusion.

13. The multilayer coil component according to claim 2, wherein a gap between a tip of the protrusion and an edge of the element body in the width direction thereof is not less than about 5 μm.

14. The multilayer coil component according to claim 2, wherein a resonant frequency of the multilayer coil component is not less than about 2 GHz.

15. The multilayer coil component according to claim 2, wherein the element body is made of one of:

a composite material including at least a ferrite material and a glass material, and a composite material including at least a ferrite material and a resin material.

16. The multilayer coil component according to claim 2, wherein each of the inner electrode layers has at least one of the protrusions, and the protrusions of the inner electrode layers adjacent to each other in a thickness direction of the element body with at least one of the magnetic layers therebetween do not overlap each other in plan view.

17. The multilayer coil component according to claim 2, wherein the inner electrode layers include first and second inner electrode layers having the protrusions and at least one third inner electrode layer which does not have the protrusion, and the at least one third inner electrode layer is arranged between the first inner electrode layer and the second inner electrode layer.

18. The multilayer coil component according to claim 2, wherein the protrusions have a substantially rectangular shape.

19. The multilayer coil component according to claim 2, wherein the protrusions have a substantially trapezoidal shape.

20. An inspection system for a multilayer coil component having a vertically-wound helical coil conductor structure, the multilayer coil component including magnetic layers constituting an element body, and inner electrode layers laminated with the magnetic layers alternately on each other, the inner electrode layers electrically connected to each other to define the helical coil conductor embedded in the element body, the inspection system comprising:

allowing the inner electrode layers to have protrusions located at opposite outer edges of the inner electrode layers in a length direction of the element body; and determining whether at least one of the protrusions is exposed through an edge of the element body in a width direction thereof to inspect quality of the multilayer coil component, wherein the protrusions are arranged between portions of the inner electrode layers where the inner electrode layers are electrically connected to each other.

* * * * *